United States Patent
Koski

(10) Patent No.: US 8,543,713 B2
(45) Date of Patent: Sep. 24, 2013

(54) COMPUTING ENVIRONMENT ARRANGED TO SUPPORT PREDETERMINED URL PATTERNS

(75) Inventor: David Koski, San Jose, CA (US)

(73) Assignee: Apple Inc., Cupertino, CA (US)

( * ) Notice: Subject to any disclaimer, the term of this patent is extended or adjusted under 35 U.S.C. 154(b) by 510 days.

(21) Appl. No.: 12/194,481

(22) Filed: Aug. 19, 2008

(65) Prior Publication Data

US 2010/0049842 A1 Feb. 25, 2010

(51) Int. Cl.
*G06F 15/16* (2006.01)
(52) U.S. Cl.
USPC .......................................... 709/229; 709/205
(58) Field of Classification Search
USPC ......................................................... 709/229
See application file for complete search history.

(56) References Cited

U.S. PATENT DOCUMENTS

| | | | |
|---|---|---|---|
| 6,567,377 B1 | 5/2003 | Vepa et al. | |
| 6,732,175 B1* | 5/2004 | Abjanic | 709/227 |
| 6,892,237 B1* | 5/2005 | Gai et al. | 709/224 |
| 7,155,515 B1 | 12/2006 | Brown et al. | |
| 7,225,188 B1* | 5/2007 | Gai et al. | 1/1 |
| 7,567,504 B2 | 7/2009 | Darling et al. | |
| 7,590,729 B2* | 9/2009 | Abjanic et al. | 709/224 |
| 7,716,180 B2* | 5/2010 | Vermeulen et al. | 707/626 |
| 2002/0019857 A1* | 2/2002 | Harjanto | 709/219 |
| 2002/0107875 A1* | 8/2002 | Seliger et al. | 707/200 |
| 2002/0169818 A1* | 11/2002 | Stewart et al. | 709/202 |
| 2005/0044242 A1* | 2/2005 | Stevens et al. | 709/228 |
| 2005/0165775 A1* | 7/2005 | Harjanto | 707/3 |
| 2005/0165790 A1* | 7/2005 | Seliger et al. | 707/10 |
| 2006/0288122 A1* | 12/2006 | Abjanic et al. | 709/238 |
| 2008/0077851 A1* | 3/2008 | Hesmer et al. | 715/234 |
| 2008/0133583 A1* | 6/2008 | Artan et al. | 707/102 |

OTHER PUBLICATIONS

"Apache HTTP Server Version 2.0, URL Rewriting Guide," Engelschall, Ralf S., Dec. 1997, http://httpd.apache.org/docs/2.0/misc/rewriteguide.html, downloaded Nov. 20, 2010, 24 pages.
"BitWorking," Joe Gregorio, Rest Tips: URI space is infinite, http://bitworking.org/news/132/REST-Tips-URI-space-is-infinite, downloaded Nov. 20, 2010, 9 pages.
"Blog for the Well Designed URLs Initiative", http://blog.welldesignedurls.org/url-design, downloaded Nov. 20, 2010, 5 pages.
Citrix Systems, Citrix NetScaler, http://www.citrix.com/english/ps2/products/product.asp?cpmtemtOD-21679, downloaded Jan. 20, 2011, 1 page.
Citrix Systems, NetScaler Overview, http://www.citrix.com/English/ps2/products/feature.asp?contentID=2300357, downloaded Jan. 21, 2011, 2 pages.
"Cool URIs don't change", http://www.w3.org/Provider/Style/URI, downloaded Nov. 20, 2010, 8 pages.

(Continued)

*Primary Examiner* — Guang Li
(74) *Attorney, Agent, or Firm* — Park, Vaughan, Fleming & Dowler LLP

(57) ABSTRACT

A computing environment for hosting web services and applications is disclosed. The computing resources of the computing environment can be managed, controlled or utilized to facilitate improved hosting of web services, such as hosting of websites. According to one aspect, Universal Resource Locators (URLs) can be programmatically defined and utilized to centralize URL descriptions which can be utilized by the computing resources. According to another aspect, customized load balancing can be provided for the computing environment.

22 Claims, 10 Drawing Sheets

(56) References Cited

OTHER PUBLICATIONS

"Configuring Friendly URLs", The Apache Jakarta Project, http://jakarta.apache.org/, published Jun. 8, 2006, http://tapestry.apache.org/tapestry4/UsersGuide/friendly-urls.html, downloaded Jan. 20, 2011, 7 pages.

"Converting rewrite rules", NGINX, http://nginx.org/en/docs/http/converting_rewrite_rules.html, downloaded Jan. 21, 2011, 2 pages.

"How NGINX processes a request", Sysoev, Igor, http://nginx.org/en/docs/http/request_processing.html, downloaded Jan. 20, 2011, 4 pages.

"Load balancing (computing)", Wikipedia, http://en.wikipedia.org/wiki/Load_balancing/(computing), downloaded Nov. 20, 2010, 7 pages.

NGINX news, http://nginx.org, downloaded Jan. 20, 2011, 4 pages.

"Pretty URLs—a guide to URL rewriting", http://roscripts.com/Pretty_URLs_-_a_guide_to URL-rewriting-168.html, posted Jul. 2, 2007, downloaded Nov. 20, 2010, 4 pages.

Ruby on Rails Guides (v3.0.3), http://guides.rubyonrails.org/#page163, downloaded Jan. 20, 2011, 4 pages.

GlassFish >> Project SailFin, http://sailfin.java.net, copyright 2008-2011, downloaded Jan. 21, 2011, 2 pages.

"Tapestry Central: Tapestry URLs: Half way there", http://tapestryjava.blogspot.com/2004/12/tapestry-urls-half-way-there.html, downloaded Jan. 21, 2011, 5 pages.

"URL dispatcher" http://docs.djangoproject.com/en/dev/topics/http/urls/?from=olddocs, copyright 2005-2010, Django Software Foundation, downloaded Nov. 20, 2010, 23 pages.

"WebObjects/Web Applications/Deployment/Apache-Wikibooks", May 11, 2009, http://en.wikibooks.org/wiki/Programming.WebObjects/Web_Applications/Deployment/Apache, downloaded Jan. 20, 2011, 4 pages.

* cited by examiner

COMPUTING ENVIRONMENT ARRANGED TO SUPPORT PREDETERMINED URL PATTERNS

BACKGROUND OF THE INVENTION

Users navigate to and within websites using a network browser or other application. However, when displaying webpages, the network browser or other application typically displays a Universal Resource Locators (URL) of the network location of the webpage. With complex websites, such as online stores, the URLs tend to be long and not user understandable due to internal factors such as website design and web applications in use. Conventionally, the URLs can be produced by application framework control, such as provided by WebObjects from Apple Inc., but such URLs are complex, long and not user understandable. An example of one such URL is:

http://store.apple.com/1-800-MY-APPLE/WebObjects/
　　AppleStore.woa/　　　　9044001　　　　/wo/
　　kv2t9HQgZXbD2QPKGZ12Mnf9UiC/2.?p=0

Another conventional approach is to manually produce and parse URLs. However, once the code is in place it is very difficult to make alterations. Another conventional approach is to directly map URLs to a programming object. The programming environments of JSP, JSF, WebObjects and Apache can provide direct mappings but such have limited ability to change and URLs are not generated in a consistent manner. Still another conventional approach uses pattern mapping to describe a URL format (i.e., using regex and "groups"), but such also has limited ability to change and its URLs are not consistent. Consequently, there remains a need for improved approaches to produce, utilize and manage URLs.

Today, data centers (e.g., Internet data centers) are often used to store content associated with websites. These data centers must be capable of handing requests from large numbers of users without significant delay. Data centers conventionally load balance across duplicative hardware and software resources. Typically, load balancers can be configured to route traffic to different servers. However, load balancing is conventionally a static configuration that only operates on data in an incoming request and is not able to utilize rule sets that are customized to website or data center design.

SUMMARY OF THE INVENTION

The invention relates a computing environment for hosting web services and applications. The computing resources of the computing environment can be managed, controlled or utilized to facilitate improved hosting of web services, such as hosting of websites.

One aspect of the invention pertains to customized load balancing in a multi-computer system in view of configuration information. In one embodiment, the configuration information can pertain to particular configurations of applications, partitions and/or resources utilized within the multi-computer system. As a result, load balancing can be customized to computing environments and/or business objectives.

Another aspect of the invention pertains to Universal Resource Locators (URLs) that can be programmatically defined and utilized to centralize URL descriptions which can be utilized by applications provided by the multi-computer system. The URLs can thus be centrally controlled or managed such that application or processes can be provided in a manner that is independent of the particular URLs. As one example, the programmatically defined URLs are able to be intelligently parsed and/or written. This permits control over the URLs as well as the ability to render the URLs descriptive or at least meaningful to recipients of the URLs or applications that display the URLs.

The invention can be implemented in numerous ways, including as a method, system, device, or apparatus (including computer readable medium). Several embodiments of the invention are discussed below.

As a method for processing a request at a computing system coupled to a network, where the computing system supports a plurality of applications, one embodiment of the invention includes at least: receiving an incoming request; parsing the incoming request to determine one or more segments of the incoming request; determining an appropriate one of the applications to receive the incoming request based on at least one of the determined segments; directing the incoming request to the determined application; processing the incoming request at the determined application; and responding to the incoming request with a response provided by the determined application.

As a computing system having a plurality of server computers for supporting a website, one embodiment of the invention includes at least: a plurality of applications configured to interface with a plurality of processes operable on a set of the server computers, and a load balancer operatively connected to direct an incoming request to one of the applications. The load balancer compares the incoming request against a set of predetermined patterns to provide comparison data, and the load balancer operates to determine one of the applications to receive the incoming request based on the comparison data.

As a computer readable medium including at least executable computer program code tangibly embodied therein for processing a request to a computing system coupled to a network, where the computing system supports a plurality of applications, one embodiment of the invention includes at least: computer program code for receiving an incoming request; computer program code for parsing the incoming request to determine one or more segments of the incoming request; computer program code for determining whether one or more of the determined segments of the incoming request match any of a plurality of predetermined patterns; computer program code for determining an appropriate one of the applications to receive the incoming request based on the matching of one or more of the determined segments to one of the predetermined patterns; and computer program code for directing the incoming request to the determined application.

As a method for managing universal resource locators, one embodiment of the invention includes at least: programmatically defining a URL pattern having a name and a URL path, the URL path structure including a plurality of path elements; defining at least one URL parameter provided as at least one of the path elements of the URL path structure; and subsequently processing a URL in accordance with the defined URL patterns and the at least one URL parameter.

As a computer readable medium including at least executable computer program code tangibly embodied therein for processing universal resource locators, one embodiment of the invention includes at least: computer program code, or a compiled data structure therefrom, that defines a plurality of predetermined URL patterns, each of the URL patterns including one or more parameters; computer program code for recognizing an incoming URL as matching one of the predetermined URL patterns; and computer program code for dispatching the incoming URL to an application for processing based on one of the predetermined URL patterns that matches the incoming URL.

Other aspects and embodiments of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates a computing environment for hosting web services and applications. The computing resources of the computing environment can be managed, controlled or utilized to facilitate improved hosting of web services, such as hosting of websites.

One aspect of the invention pertains to customized load balancing in a multi-computer system in view of configuration information. In one embodiment, the configuration information can pertain to particular configurations of applications, partitions and/or resources utilized within the multi-computer system. As a result, load balancing can be customized to computing environments and/or business objectives. For example, load balancing can be customized to business logic, session data, and/or dynamic site data.

Another aspect of the invention pertains to Universal Resource Locators (URLs) that can be programmatically defined and utilized to centralize URL descriptions which can be utilized by applications provided by the multi-computer system. The URLs can thus be centrally controlled or managed such that application or processes can be provided in a manner that is independent of the particular URLs. As one example, the programmatically defined URLs are able to be intelligently parsed and/or written. This permits control over the URLs as well as the ability to render the URLs descriptive or at least meaningful to recipients of the URLs or applications that display the URLs.

Embodiments of various aspects of the invention are discussed below with reference to FIGS. 1-9B. However, those skilled in the art will readily appreciate that the detailed description given herein with respect to these figures is for explanatory purposes as the invention extends beyond these limited embodiments.

Figure 1:
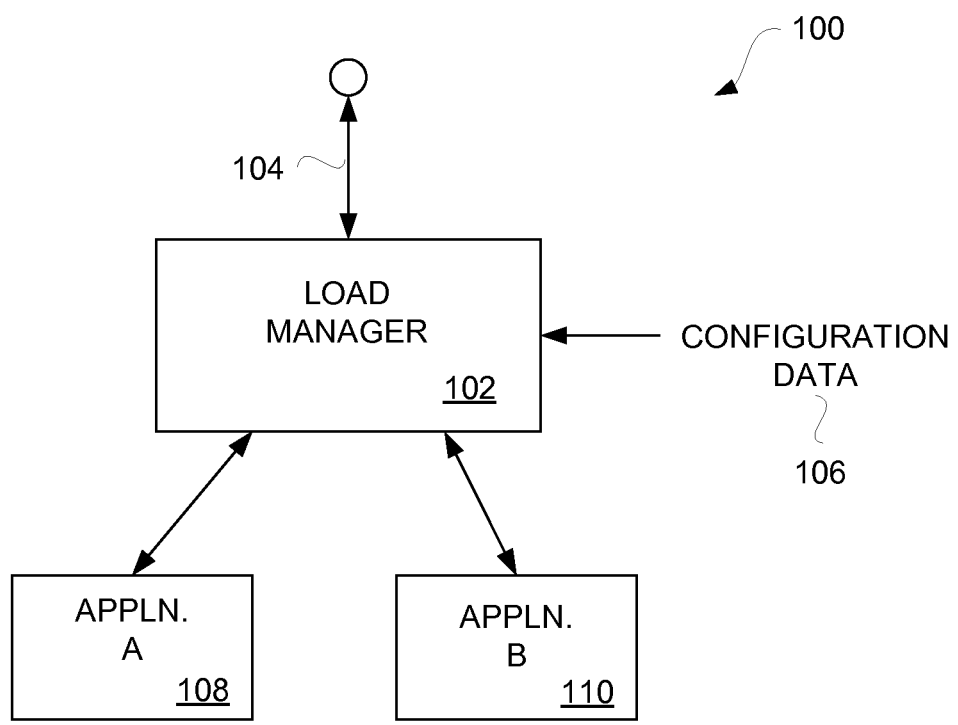
FIG. 1 is a block diagram of a computing system according to one embodiment of the invention.

FIG. 1 is a block diagram of a computing system 100 according to one embodiment of the invention. The computing system 100 typically utilizes a plurality of different computing devices that are interconnected to provide significant computing resources. In one embodiment, the computing system 100 can be utilized to support a web-based server system that can receive incoming requests for particular webpages, access and/or process data to form appropriate responses, and then supply appropriate responses back to the requesters in the form of the particular webpages.

The computing system 100 can utilize a load manager 102. In general, the load manager 102 operates to distribute a processing "load" across the different computing resources. More particularly, the load manager 102 can receive an incoming request over a network link 104, and evaluate the incoming request utilizing configuration data 106 to determine an appropriate application to process the incoming request. The configuration data 106 can, in one embodiment, be considered configuration data that serves to customize the load manager 102 for the computing environment in which the load manager 102 operates. In the embodiment illustrated in FIG. 1, the load manager 102 can direct the incoming request to either application A 108 or application B 110. The configuration data 106 can be used to control or guide the manner in which the load manager 102 determines whether the incoming requests should be directed to the application A 108 or the application B 110. As a result, the load manager 102 is able to intelligently distribute processing loads in accordance with the computing environment. Although FIG. 1 illustrates the load manager 102 distributing processing loads to only a pair of applications, it should be understood that the load manager 102 can distribute processing load to a large number of computing resources, such as applications, partitions, processes or devices.

In one embodiment, the configuration data 106 pertains to or includes predetermined network address patterns, namely, predetermined universal resource locator (URL) patterns. The load manager 102 can determine whether the incoming request 104, which itself is or has a URL, matches any of the predetermined URL patterns. If it is determined that the incoming request 104 does match one of the predetermined URL patterns, the load manager 102 can cause the incoming request to be directed to the application that has previously been associated with the predetermined URL pattern.

In one embodiment, the configuration data 106 is provided as one or more files containing a compiled version of the predetermined URL patterns. The predetermined URL patterns can be programmatically defined and then compiled into a binary form (compiled version). In one implementation, to facilitate rapid matching with respect to the predetermined URL patterns, the configuration data 106 can be provided in a data structure suitable for efficient matching. For example, one data structure suitable for efficient matching is a Trie data structure.

Figure 2:
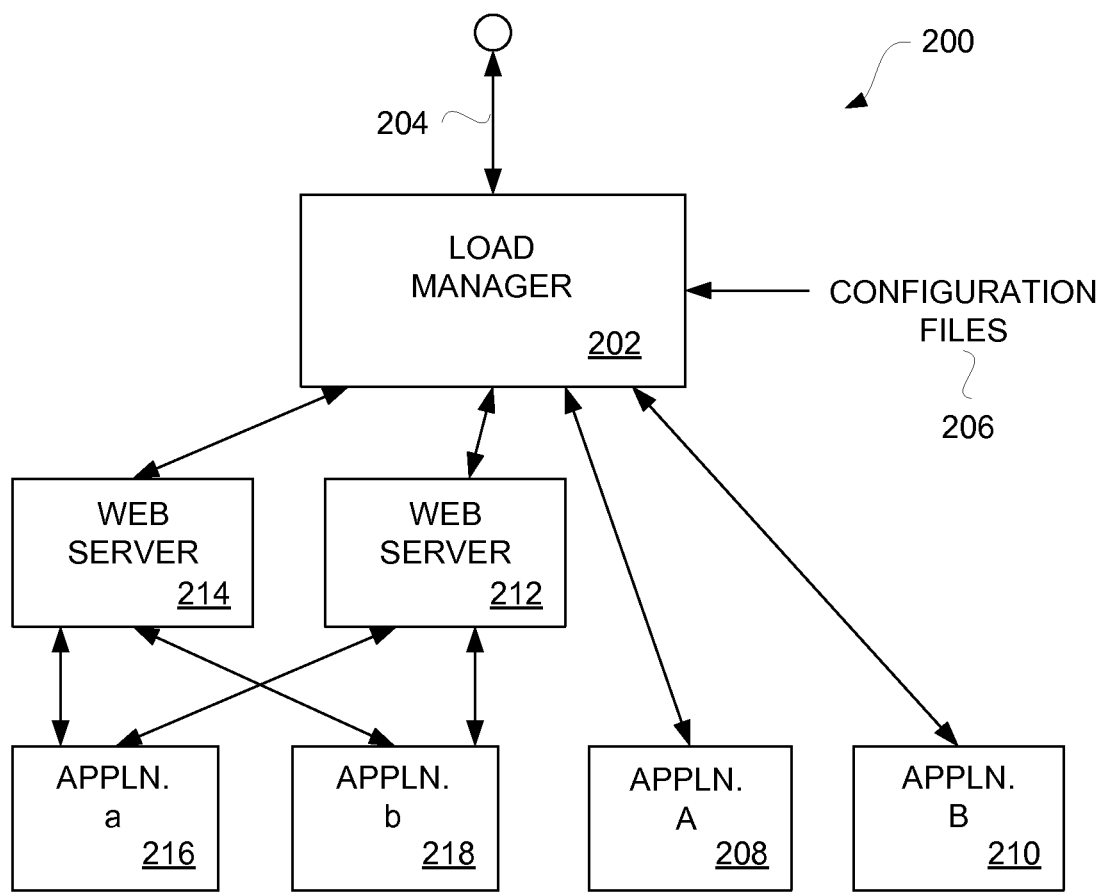
FIG. 2 is a block diagram of a computing system according to another embodiment of the invention.

FIG. 2 is a block diagram of a computing system 200 according to one embodiment of the invention. The computing system 200 is somewhat similar to the computing system 100 illustrated in FIG. 1. Like the computing system 100, the computing system 200 typically utilizes a plurality of different computing devices that are interconnected to provide significant computing resources. In one embodiment, the computing system 200 can be utilized to support a web-based server system that can receive incoming requests for particular webpages, access and/or process data to form appropriate responses, and then supply the appropriate responses back to the requester in the form of the particular webpages.

The computing system 200 can utilize a load manager 202. The load manager 202 can receive an incoming request over a network link 204, and evaluate the incoming request utilizing configuration file 206 to determine an appropriate application to process the incoming request. The configuration file 206 can contain configuration data that serves to customize the load manager 202 for the computing environment in which the load manager 202 operates. The load manager 202 can also direct the incoming request to either application A 208 or application B 210. More particularly, the load manager 202 can direct the incoming request to application A 208 or application B 210 based on configuration data provided in the configuration file 206. As a result, the load manager 202 is able to intelligently distribute processing loads in accordance with the computing environment.

In one embodiment, the configuration file 206 can contain predetermined URL patterns that are associated with the applications 208 and 210. If it is determined that the incoming request does match one of the predetermined URL patterns, the load manager 202 can cause the incoming request to be directed to the application that has previously been associated with the predetermined URL pattern. The application receiving the incoming request can then process the incoming request to produce an appropriate response, and then supply the appropriate response back to the requester in the form of the particular webpages.

On the other hand, if it is determined that the incoming request does not match any of the predetermined URL patterns, the load manager 202 can direct the incoming request to a web server 212 or a web server 214. Here, the computing system 200 can further include one or more web servers, such as the web server 212 and the web server 214, which are suitable to process or forward the incoming request. The web server 212, 214 may be able to satisfy the incoming request. Alternatively, the web server 212, 214 may direct the incoming request to any of a number of available applications. For example, as illustrated in FIG. 2, either of the web servers 212 and 214 can direct the incoming request to application A 216 or application B 218. The manner by which the load manager 202 selects one of the web servers 212 and 214 may not use the configuration file 206. Instead, the load manager 202 can merely distribute the incoming requests to a web server so as to balance the load across the web servers 212 and 214 without regard for the computing environment. Alternatively, the load manager 212 might use a simplified rule, such as a rule based on a file extension, to direct the incoming requests to one of the web servers 212 and 214. For example, if the incoming request is a request for a specific image file (e.g., ".jpg" file extension), then the load manager 202 can direct the incoming request to one of the web servers 212 and 214 for processing, which merely involves retrieval of the image file.

Although FIG. 2 illustrates the load manager 202 distributing processing loads to a pair of web servers or several applications, it should be understood that the load manager 102 can distribute processing loads to a large number of web servers or applications.

Figure 3:
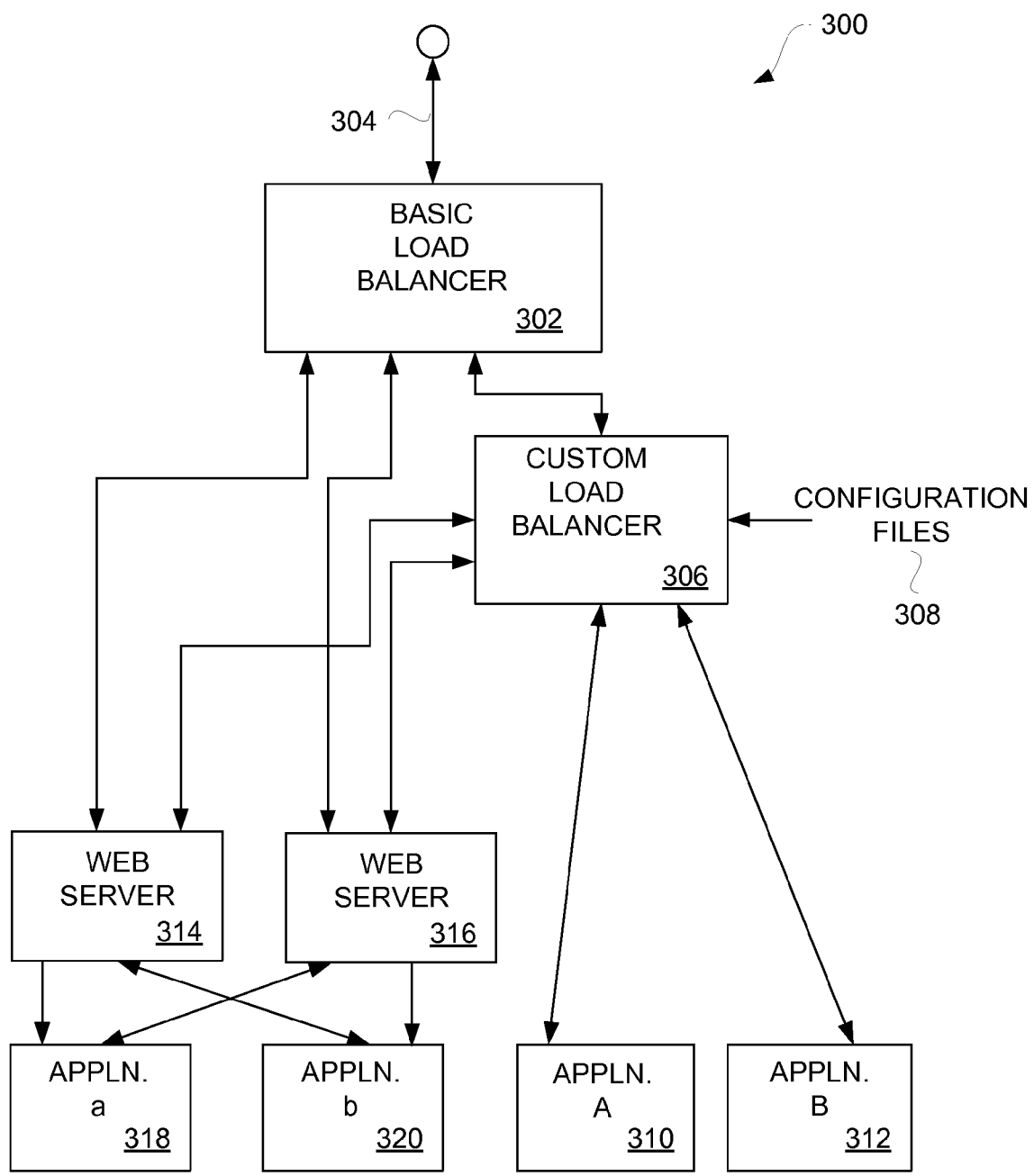
FIG. 3 is a block diagram of a computing system according to still another embodiment of the invention.

FIG. 3 is a block diagram of a computing system 300 according to one embodiment of the invention. The computing system 300 includes a basic load balancer 302. The basic load balancer 302 can receive an incoming request over a network link 304. The basic load balancer 302 can then determine whether the incoming request 304 should be directed to a custom load balancer 306. The custom load balancer can, for example, pertain to the load manager 102 illustrated in FIG. 1 or the load manager 202 illustrated in FIG. 2. The custom load balancer 306 can cause the incoming request to be directed to a particular application based on configuration data provided in a configuration file 308. In particular, the custom load balancer 306 can compare the incoming request with predetermined URL patterns associated with the configuration data provided by the configuration file 308, and then direct the incoming request to either application A 310 or application B 312 based upon the comparison results. The application A 310 or application B 312 receiving the incoming request can then itself (or with assistance of other processing resources) produce a response that can be returned to the requester. For example, when the incoming request is a request for a particular webpage, the application A 310 or application B 312 can render the requested webpage and provide the requested webpage to the requester.

The computing system 300 also includes web servers 314 and 316. The basic load balancer 302 can direct a subset of the incoming requests to the web servers 314 and 316. For example, if there is a basic rule or class of incoming request that cannot or need not be processed by the custom load balancer 306, such incoming requests can be directed to one of the web servers 314 and 316. The web servers 314 and 316 are able to access and utilize application a 318 and application b 320 if needed to satisfy an incoming request. The web servers 314 and 316 can thus satisfy the incoming request by returning a response to the requester. Additionally, the custom load balancer 306 can also be coupled to the web servers 314 and 316 so that the custom load balancer 306 can optionally direct an incoming request that does not match any of the predetermined URL patterns to one of the web servers 314 and 316 for processing.

Figure 4:
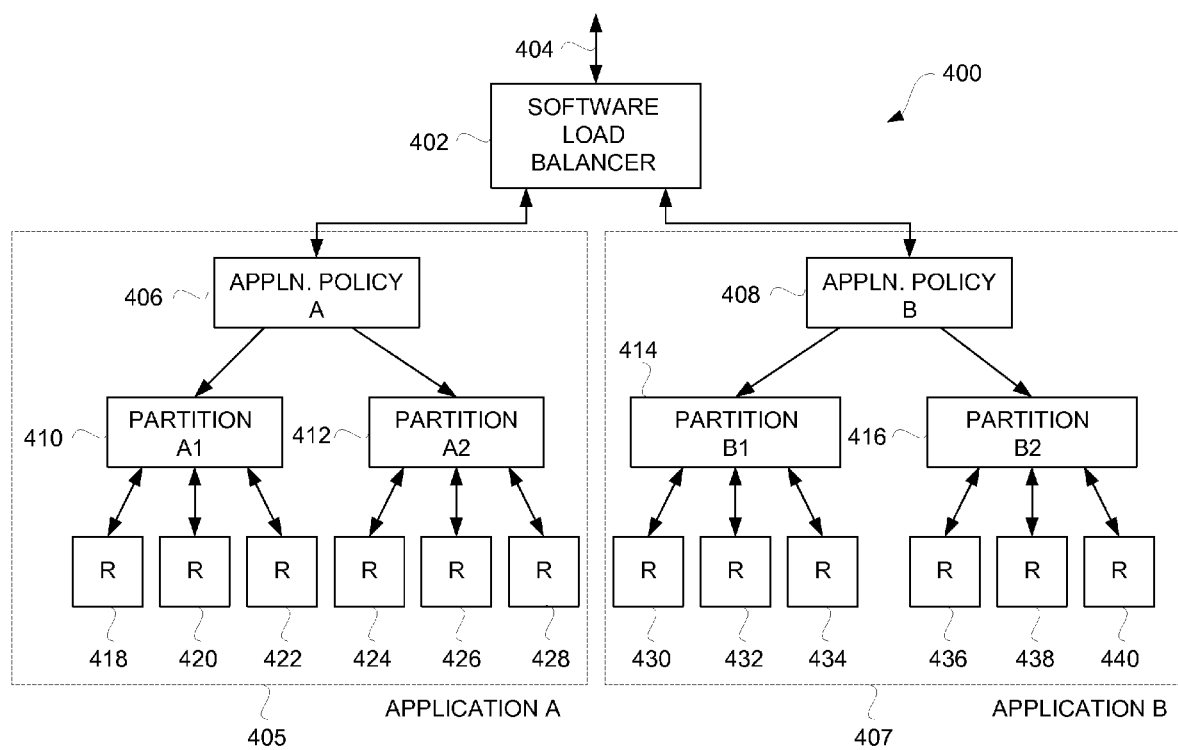
FIG. 4 is a block diagram of a computing system according to yet still another embodiment of the invention.

FIG. 4 is a block diagram of a computing system 400 according to one embodiment of the invention. In one embodiment, the computing system 400 can be utilized to support a web-based server system that can receive incoming requests for particular webpages, access and/or process data to form appropriate responses, and then supply appropriate responses back to the requesters in the form of the particular webpages.

The computing system 400 can utilize a software load balancer 402. In general, the software load balancer 102 operates to distribute a processing "load" across the different computing resources. As an example, the load manager 102 illustrated in FIG. 1 can be implemented by the software load balancer 402. The software load balancer 402 can receive an incoming request over a network link 404, and evaluate the incoming request to determine an appropriate application to process the incoming request. The software load balancer 402 can be programmatically operated to balance the processing load from incoming requests to various resources of the computing system 400. In particular, the software load balancer 402 can direct an incoming request to either application A 405 or application B 407. The decision by the software load balancer 402 can be based configuration data (such as system configuration data). As noted herein, the configuration data can include or pertain to predetermined patterns.

The applications 405 and 407 manage processing of incoming requests as supplied by the software load balancer 402. If the application A 405 receives the incoming request, an application policy A 406 within the application A 405 can then decide whether the incoming request should be directed to partition A1 410 or partition A2 412. The decision by the application policy A 406 can be based configuration data (such as system configuration data). Similarly, if the application B 407 receives the incoming request, an application policy B 408 can then decide whether the incoming request should be directed to partition B1 414 or partition B2 414. The decision by the application policy B 408 can also be based configuration data (such as system configuration data). In one embodiment, the application policy A 406 and the application policy B 408 pertain to modules or data structures that include a name and a policy and also use configuration data (e.g., the system configuration data). In one embodiment, the partitions 410-416 are also modules or data structures.

For a given incoming request, one of the partitions 410-416 can receive the incoming request and then in turn direct the incoming request to a destination resource 418-440. In one embodiment, a destination resource can represent a process operating on a hardware device within the computing system 400. For example, the computing system 400 can pertain to a data center and the destination resources 418-440 can be a physical host, applications (e.g., web applications), or ports of the data center. The computing system 400 typically utilizes a plurality of different computing devices that are interconnected to provide significant computing resources. The destination resource receiving the incoming request can process the incoming request to determine data for a response. One or more of the destination resource, the partition and the application policy can form a response to the incoming request, and the application can cause the response to be returned to the requester. As shown in FIG. 4, the destination resources 418-440 can be allocated to particular partitions 410-416. For example, the partition A1 410 has destination resources 418, 420 and 422 associated therewith. Alternatively, the resources could be shared by different partitions.

In one embodiment, the computing system 400 implements a software load balancer according to one embodiment of the invention. In such an embodiment, the software load balancer 402 represents a front-end interface to the software load balancer. Also, in this embodiment, the application policies 406 and 408 and the partitions 410-416 are all part (e.g., modules or data structures) of the software load balancer. Still father, in this embodiment, the destination resources 418-440 can be considered separate or part of the software load balancer.

Figure 5:
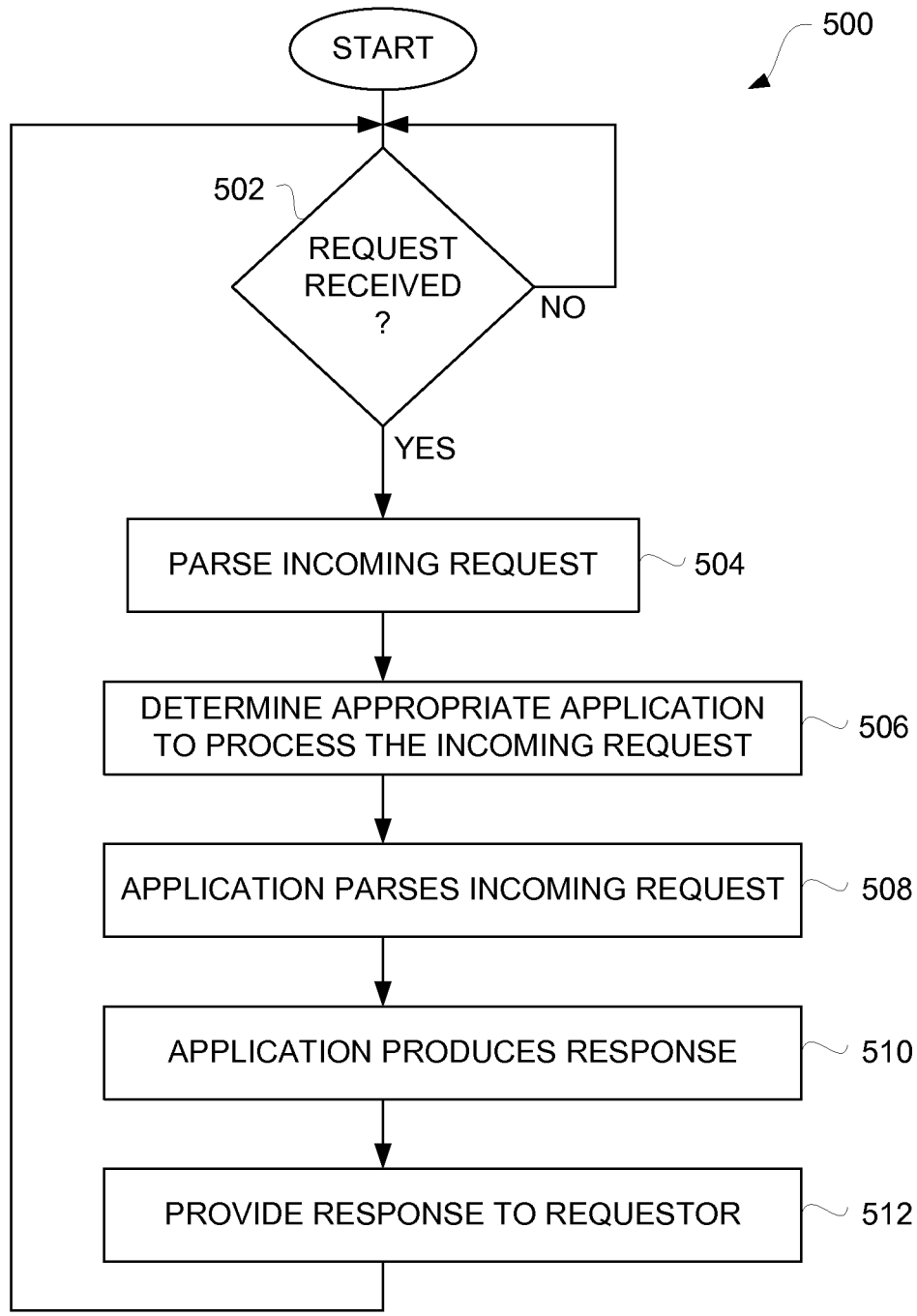
FIG. 5 is a flow diagram of a response process according to one embodiment of the invention.

FIG. 5 is a flow diagram of a response process 500 according to one embodiment of the invention. The response process 500 is processing that can be performed by any of the computing systems 100, 200, 300 or 400 discussed above. The response process 500 can begin with a decision 502 that determines whether a request has been received. For example, the request can be received by a computing system over a network and seek a response containing certain information. When the decision 502 determines that a request has not been received, then the response process 500 waits until a request has been received. In other words, the response process 500 can be deemed to be invoked once a request is received.

In any event, once the decision 502 determines that a request has been received, the incoming request can be parsed 504. For example, the incoming request can be in the form of a network address (e.g., URL) for a webpage containing certain information. The network address can be parsed 504 by identifying the multiple segments of the URL. Next, an appropriate application to process the incoming request can be determined 506. For example, based upon one or more segments that have been parsed 504 from the incoming request, it can be determined which of a plurality of available applications is appropriate to process the incoming request. The available applications can, in one embodiment, pertain to data structures used by the software load balancer. The incoming request can then be directed to an appropriate application where the incoming request can be parsed 518. Although the incoming request was parsed 504 to determining 506 the appropriate application to process the incoming request, the appropriate application, upon receiving the incoming request, can itself parse 508 the incoming request. In this regard, the parsing 508 of the incoming request by the determined application can be different than the parsing 504. For example, the application can parse the incoming request to a greater extent so as to further understand the incoming request. The parsing 508 may identify one or more segments that correspond to parameters which may be objects. Next, the application can process the incoming request to produce 510 a response. The application that processes the request can be provided locally (e.g., within the load balancer or remotely with an external application). Thereafter, the response can be provided 512 to the requester. Following the block 512, the response process 500 can return to repeat the decision 502 and subsequent blocks so that the response process 500 can similarly process other incoming requests.

Figure 6:
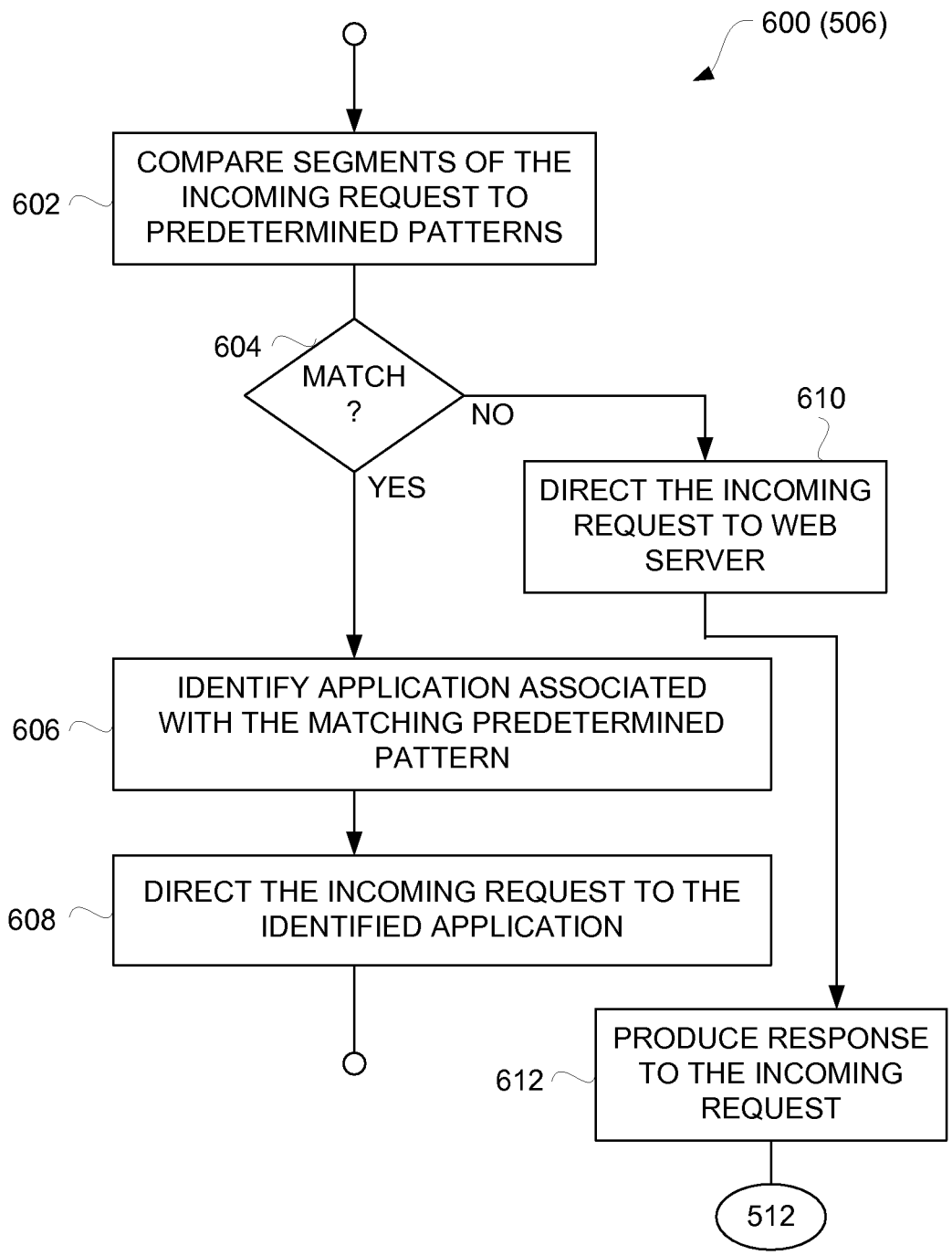
FIG. 6 is a flow diagram of an application determination process according to one embodiment of the invention.

FIG. 6 is a flow diagram of an application determination process 600 according to one embodiment of the invention. The application determination process 600 can, for example, be utilized as processing performed by the block 506 of the response process 500 illustrated in FIG. 5. The application determination process 600 can compare 602 segments of the incoming request to predetermined patterns. The predetermined patterns can be provided in the form of a data structure that facilitates match processing by the application determination process 600. After the segments of the incoming request have been compared 602 to the predetermined patterns, a decision 604 can determine whether the segments of the incoming request match any of the predetermined patterns. When the decision 604 determines that the segments match one of the predetermined patterns, an application associated with the matching predetermined pattern can be identified 606. Then, the incoming request can be directed 608 to the identified application. Following the block 608, the application determination process 600 is complete with the application to process the incoming request having been determined. Thereafter, the processing can return to the block 508 of the response process 500 illustrated in FIG. 5.

Alternatively, when the decision 604 determines that the segments of the incoming request do not match any of the predetermined patterns, the incoming request can be directed 610 to a web server. The web server can then operate to produce 612 a response to the incoming request. Following the block 612, the processing can proceed to block 512 of the response process 500 so that the response can be provided 512 to the requester.

As noted above, a data structure can be provided to configure or influence request processing. As one example, assume that an exemplary data structure is to include the following set of predetermined patterns:

```
/<Store>
/<Store>/browse/<Path>
/<Store>/help/<Path>
/<Store>/product/<Part>
```

These predetermined patterns can respectively correspond to a website application having a home webpage, a browse webpage, a help webpage, and a product webpage. Each of the paths is made up of a combination of segments separated by delimiters ("/"). Each segment is either a parameter or a path. The parameter or path can be static or dynamic. In this example, "<Store>" and "<Part>" are dynamic parameters, and "<Path>" is a dynamic path. Also, "browse", "help" and "product" are all static parameters.

Figure 7:
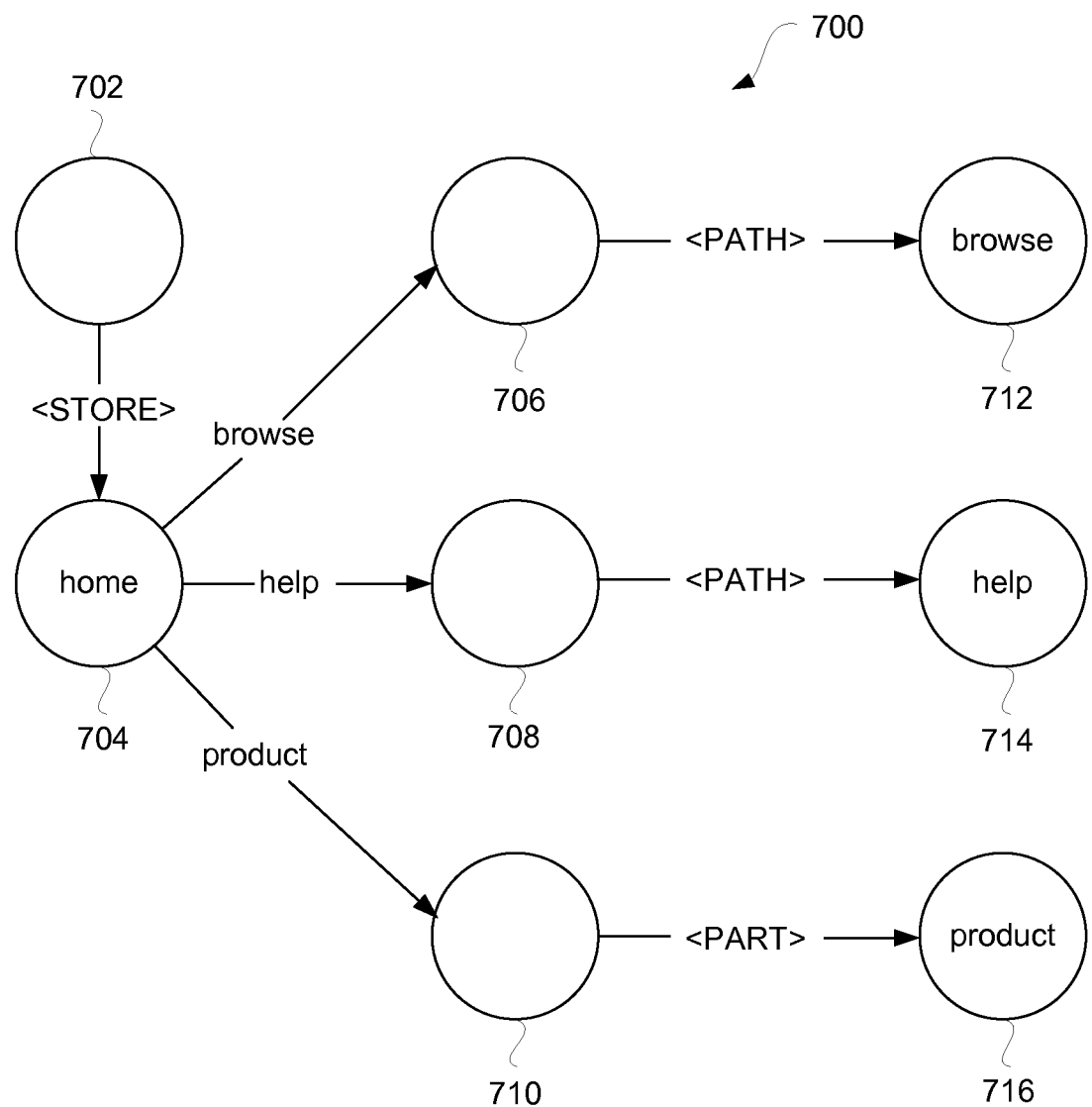
FIG. 7 is a schematic illustration of an exemplary data structure according to one embodiment of the invention.

FIG. 7 is a schematic illustration of an exemplary data structure 700 according to one embodiment of the invention. The exemplary data structure 700 can represent one implementation of the exemplary data structure that represents the set of predetermined patterns in the above example. The exemplary data structure 700 is a Trie data structure having branch nodes 702-710 and element nodes 712-716. More particularly, the exemplary data structure 700 includes an initial branch node 702, a home branch/element node 704, a browse branch node 706, a help branch node 708, a product branch node 710, a browse element node 712, a help element node 714, and a product element node 716. In this example, the branch/element node 704 can serve as either a branch node or an element node. Use of a Trie data structure serves to facilitate rapid, simultaneous searching for predetermined patterns that match an incoming request.

Figure 8:
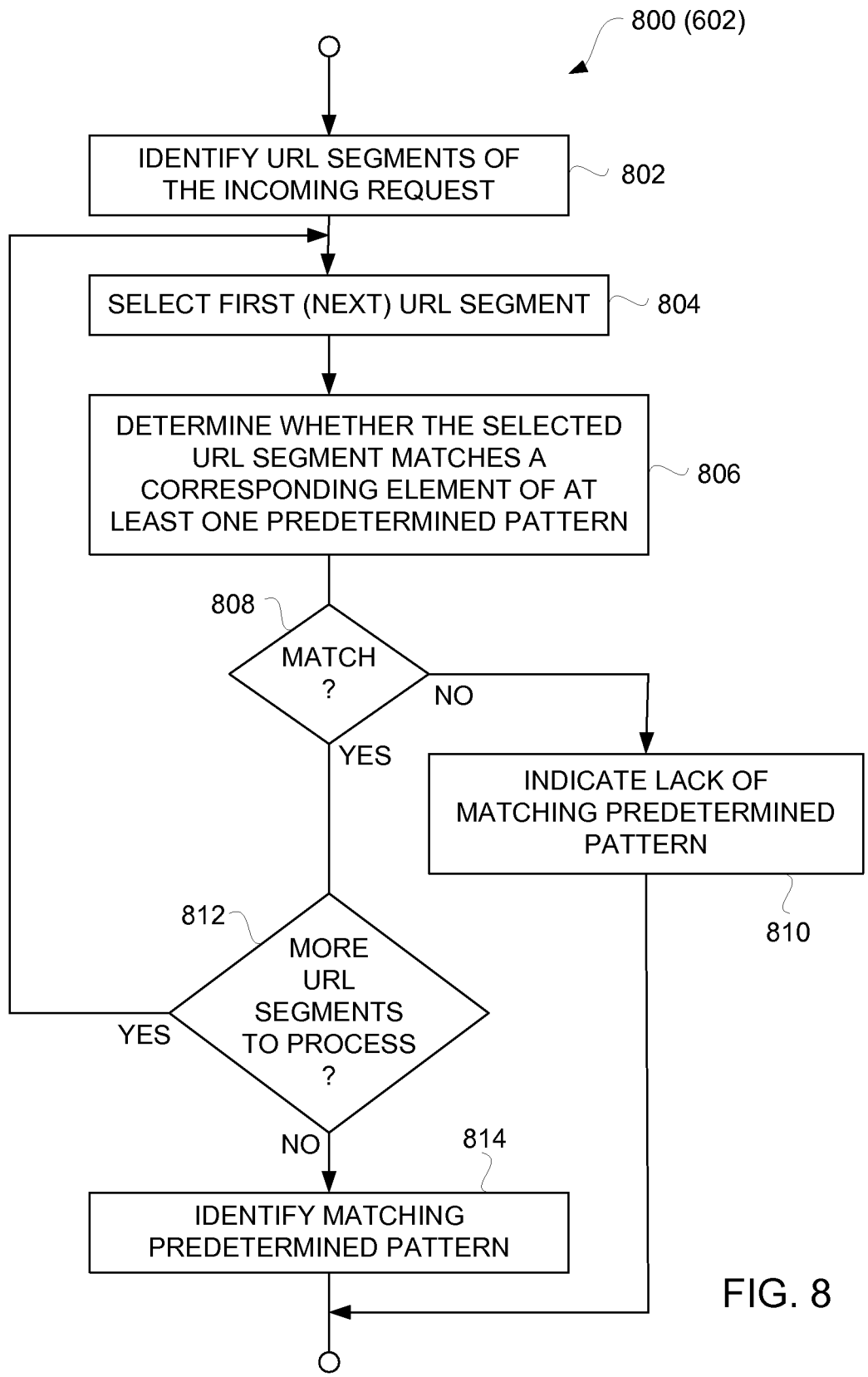
FIG. 8 is a flow diagram of a compare process according to one embodiment of the invention.

FIG. 8 is a flow diagram of a compare process 800 according to one embodiment of the invention. The compare process 800 is, for example, processing suitable for implementing the block 602 of the application determination process 600 illustrated in FIG. 6.

The compare process 800 can identify 802 URL segments of the incoming request. Typically, the incoming request is a URL having a plurality of URL segments. One or more of the identified URL segments can pertain to parameters, and one of the identified URL segments can pertain to a path (which may include one or a series of segments). The parameters can be either static or dynamic. A dynamic parameter can also be referred to as an object (or programming object).

Next, a first URL segment is selected 804 from the URL segments that have been identified 802. Then, it is determined 806 whether the selected URL segment matches a corresponding element of at least one predetermined pattern. Typically, the URL segment is simultaneously compared to a plurality of different elements associated with a plurality of predetermined patterns. By simultaneously comparing the URL segment to these various elements of the plurality of predetermined patterns, the compare process 800 can rapidly determine whether a matching pattern exists. After it has been determined 806 whether the selected URL segment matches a corresponding element of at least one predetermined pattern, a decision 808 can determine whether there has been an element match. When the decision 808 determines that there is no matching element for the selected URL element, the lack of a matching predetermined pattern can be indicated 810. At this point, in the case in which there is no match for the selected URL element, the compare process 800 ends with no match being found.

On the other hand, when the decision 808 determines that there is a match for the selected URL element, a decision 812 can determine whether there are more URL segments to be processed. When the decision 812 determines that there are more URL segments to process, the compare process 800 returns to repeat the block 804 so that a next URL element can be selected and similarly processed. Alternatively, when the decision 812 determines that there are no more URL segments to process, the matching predetermined pattern can be identified 814. In this case, the compare process 800 ends with the matching predetermined pattern being identified 814.

Figure 9A:
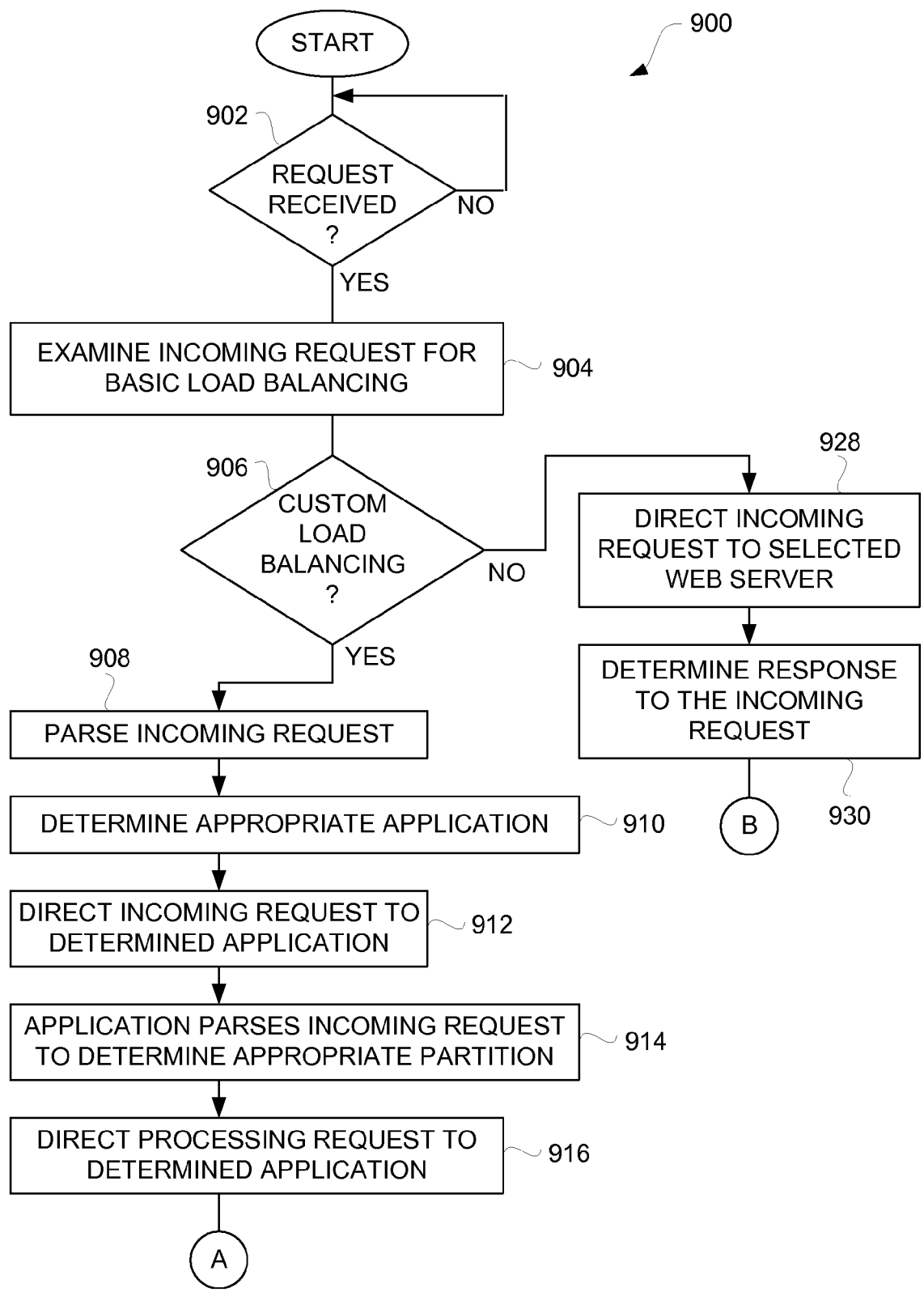
FIGS. 9A and 9B are flow diagrams of a response process according to one embodiment of the invention.
Figure 9B:
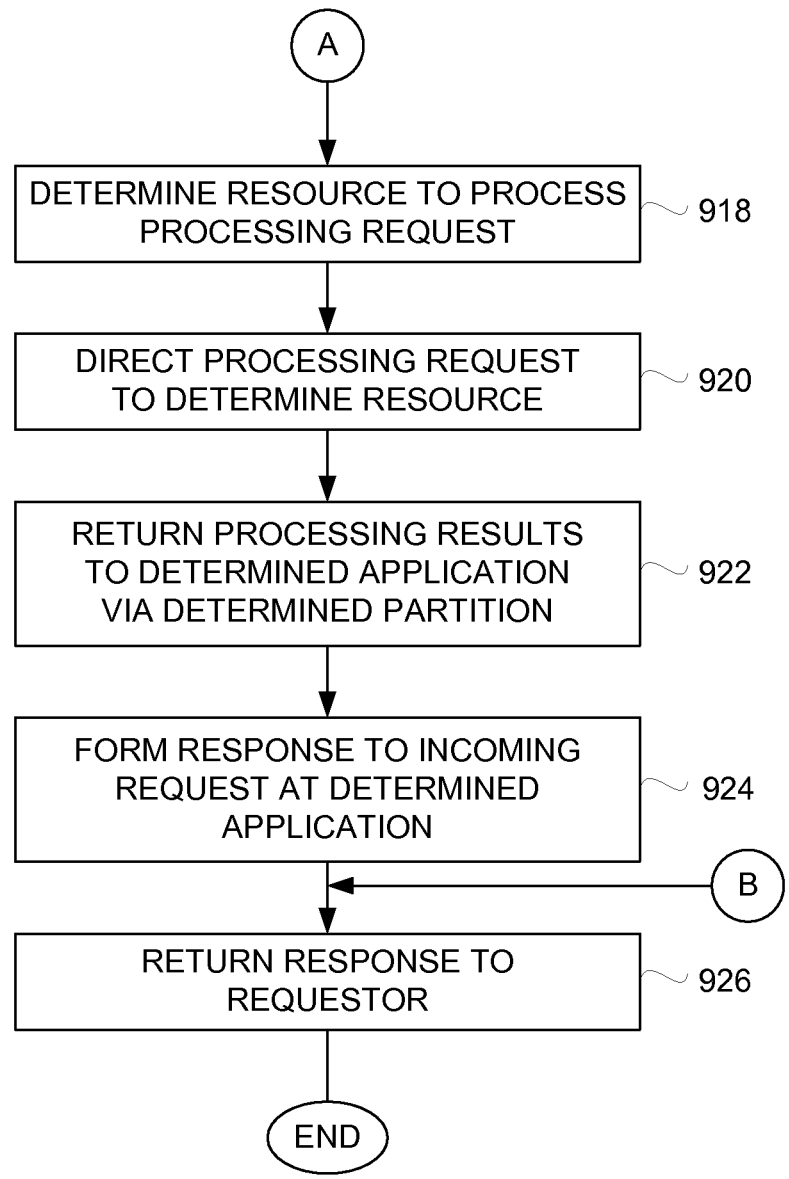

FIGS. 9A and 9B are flow diagrams of a response process 900 according to one embodiment of the invention. The response process 900 can, for example, pertain to processing performed utilizing the computing system 300 illustrated in FIG. 3.

The response process 900 can begin with a decision 902 that determines whether a request has been received. When the decision 902 determines that a request is not yet been received, the response process 900 can await receipt of a request. The response process 900 can thus be deemed invoked when a request is received. In any event, once the decision 902 determines that a request has been received, the incoming request can be examined 904 for basic load balancing. As an example, in FIG. 3, the basic load balancer 302 can perform the basic load balancing. In one embodiment, the basic load balancing can determine whether to perform custom load balancing with respect to the incoming request. Hence, after examining 904 the incoming request for basic load balancing, a decision 906 can determine whether custom load balancing is to be performed.

When the decision 906 determines that custom load balancing is to be performed, additional processing can be carried out. In one implementation, the additional processing can be associated with processing performed by the custom load balancer 306 and the associated one or more applications 310 and 312 illustrated in FIG. 3. In particular, the incoming request can be parsed 908 to identify segments as discussed above. Next, an appropriate application can be determined 910. Here, the segments of the incoming request can be compared against a plurality of predetermined patterns, and when a match is found, the application corresponding to the matching predetermined pattern can be determined 910.

Once the appropriate application has been determined 910, the incoming request can be directed 912 to the determined application. The determined application can then parse 914 the incoming request to determine an appropriate partition. Although FIG. 3 does not illustrate partitions, FIG. 4 illustrates how partitions can be utilized below the appropriate application to further manage utilization of processing resources being provided by the computing system. After the appropriate partition is determined, the appropriate application can then direct 916 a processing request to the determined partition. In other words, the appropriate application can request certain processing be performed by the determined partition on its behalf. The partition can in turn determine 918 a resource (processing resource) to process the processing request. The processing request can then be directed 920 the determined resource. The determined resource can then return 922 the processing results to the determined application via the determined partition. A response to the incoming request can then be formed 924 at the determined application utilizing the processing results that have been provided by the determined partition. Thereafter, the response can be returned 926 to the requester. Following the block 926, in the case in which custom load balancing is performed, the response process 900 can end.

On the other hand, when the decision 906 determines that custom load balancing is not to be performed, the incoming request can be directed 928 to a selected web server. Then, a response to the incoming request can be determined 930 at the selected web server. Following the determination 930 of the response to the incoming request, the response process 900 can proceeded to return 926 the response to the requester. In this case, custom load balancing is not performed, but a response can nevertheless be returned to the requester.

According to one aspect of certain embodiments of the invention, predetermined paths can be used to mange utilization of available processing resources (e.g., load balancing). These predetermined paths can be described in configuration data that can be used to customize operation of a load balancer. The configuration data can be provided as a data structure that facilitates match processing. One example of a data structure is a Trie tree having a tree structure with branch nodes and element nodes.

In one embodiment, predetermined patterns of a website that are to be supported by a computing system can be programmatically defined. Thereafter, applications or processes operating on requests for webpages of the website can utilize programmatically defined predetermined patterns that parse or write network addresses (e.g., URLs) for such webpages. Moreover, in one embodiment, the programmatically defined predetermined patterns can be compiled into configuration data (e.g., data structure, such as a Trie) which can be searched for matching of incoming requests to the predetermined patterns.

As noted herein, one aspect of the invention pertains to programmatically defining URLs. One embodiment of programmatically defining the predetermined patterns is as follows. The programmatic definitions are able to be used for not only generating URLs but also recognizing them. A syntax for illustration can describe a pattern as follows:

```
name = {
    url = "/some/path";
};
```

This gives the pattern a name so that the software can refer to it and defines the structure of the URL as "/some/path". Many URLs need to define parameters to a web application. The definition can also include one or more parameters. As an example, a parameter in the path can be defined by:

```
STORE = {
    name = store;
    type = StoreParameter;
};
home = {
    url = "<STORE>/home";
};
```

The resulting pattern can describe the pattern for a homepage as something that indicates the store followed by "home". For example, the resulting pattern can represent URLs such as "/us/home", "/uk/home" or "us-edu/home" which can represent home pages for different stores (based on countries, market or classification). Similar constructs can be used to describe optional/required parameters, query string (e.g., "?sort=top-sellers") parameters, and their types.

A "refactoring" or "composition" technique can be used to add an additional feature. Consider the following example of refactoring:

```
pattern1 = {
    url = "/AppleStore/WebObjects/Mercury.woa/some/path";
};
pattern2 = {
    url = "/AppleStore/WebObjects/Mercury.woa/different/path";
};
``` might be written as:

```
MERCURY = {
    fragment = "/AppleStore/WebObjects/Mercury.woa";
};
pattern1 = {
    url = "<MERCURY>/some/path";
};
pattern2 = {
    url = "<MERCURY>/different/path";
};
```

Hence, common path elements can be expressed by factoring them out and building the final representation through composition.

Advantageously, software programs can now refer to these patterns in URL generation. For example, a software program that writes a URL can merely specify a pattern and a parameter, such as:

<a pattern="home" store="[store]"> . . .

Here, the pattern to be emitted is named is "home" and the parameter is a "store" parameter. The actual representation of this URL is encapsulated by the URL system and the software code is referring to it symbolically. If the URL pattern subsequently changes, the call sites in software programs need not change (unless additional parameters are now required). For example, if the pattern is redefined as:

```
home = {
    url = "<STORE>";
};
```

URLs would be emitted and recognized as: "/us", "/uk" or "/us-edu". However, if the pattern is subsequently changed to the pattern of:

```
home = {
    url = "home?store=<STORE>";
};
``` then the URLs would be emitted and recognized as: "/home?store=us", "/home?store=uk" or "/home?store=us-edu". The dispatch mechanism also has access to these patterns and can recognize "/us/home" as referring to the "home" pattern with "us" providing the store parameter.

The defined patterns can further describe how to dispatch the URL. For example, additional metadata can be attached to the URL definition. This might tell the software program how to dispatch the recognized URL (e.g., what class/page it represents) Moreover, documentation could also be attached to the definition.

The defined patterns can also be used with URL forwarding or URL translation. In one embodiment, legacy URLs can be described with some additional metadata:

```
old-pattern = {
    url = "/1-800-MY-APPLE/WebObjects/AppleStore.woa";
    parameters = {
        // AppleStore really means "us"
        store = us;
    };
    rewrite = home;
};
``` and then provides the URL they now map to:

```
home = {
    url = "<STORE>/home";
};
```

This approach can be used with URLs that get deprecated or change over time and leverages the URL pattern definitions for both recognizing old URLs and understanding the format of the new URLs.

In another embodiment, canonicalization rules can be used to consolidate multiple addresses for the same page. Sometimes a website has several different ways of addressing the same page. For example, the following URLs can all lead to the same page:

http://store.apple.com/us/ipod
http://store.apple.com/us/browse/home/family/ipod
http://store.apple.com/1-800-MY-APPLE/WebObjects/
AppleStore.woa?family=ipod
http://store.apple.com/1-800-MY-APPLE/WebObjects/
AppleStore.woa/wa/
RSLID?nnmm=browse&node=home/family/ipod The first URL is the most desirable because it is the shortest and clearest. The rewriting technique described above can be used to describe that the latter two legacy URLs as mapping to the first URL. However, another approach would be to describe that the "browse" pattern as having some canonical forms based on the "path" parameter:

```
browse = {
url = "<STORE>/browse/<PATH>";
canonical-form = {
path = {
"home/family/ipod" = {
pattern = ipod;
};
};
};
};
ipod = {
url = "<STORE>/ipod";
};
```

Here the metadata attached to the "browse" rules says that if the path is equal to "home/family/ipod" then it should substitute the ipod pattern. Advantageously, a single URL definition can be use in this manner across various sites. The system can automatically substitute the canonical URL based on the parameters. If a usage lands on a URL that has a better canonical form, the application can automatically redirect them to the canonical URL. As an additional benefit, search engine optimization operates when a single URL is used for a single page.

In one embodiment, the parameters within a defined pattern may be complex types that are serialized into and out of the URL. The encapsulation allows us to symbolically name our patterns and parameters on the program side and generate the appropriate URLs. For example, the parameter for the home page is called "store" to the program, but might be rendered in the URL path (e.g., "/us/home") or as a query string parameter (e.g., "/home?s=us"). In both cases, the representation in the URL is encapsulated by the URL system and not of any concern to the calling software program. Hence, the parameters of a defined pattern can be complex values or objects (i.e., programming language objects) which can be passed in as parameters and extracted when recognized. For example, one representation of a store might be a Store object:

```
Store {
String name;
...
}
```

The such case, the current Store object is passed in (as opposed to the string "us"). The type of the parameter:

```
STORE = {
name = store;
type = StoreParameter;
};
``` can indicate that we want the name to be put in th URL and when recognized, lookup the store with that name.

Additionally, in one embodiment, the system may provide some automatic features based on the machine description of the URL patterns. One automatic feature is source code documentation. Documentation for non-annotated source code can be automatically generated based on the patterns and their arguments. If the pattern definitions provide some annotations, such can also be included in the documentation. Another automatic feature is an interactive URL debugger that can assist in troubleshooting parsing and generation issues.

Advantageously, any URL can be described using the programmatic definitions. Once defined, the patterns can be used for both generation and recognition of URLs. Callers never need to worry about the exact format of the URLs because that is encapsulated. Additionally, the features like canonicalization and complex parameter types remove the need to manually write code that would do that for you. The same pattern can be used for both the generation and recognition of the URLs. These patterns can be compiled into state machines. In one implementation, any number of URL patterns can be recognized with constant cost (based only on the length of the URL rather than the number of patterns).

The various aspects, embodiments, implementations or features of the invention can be used separately or in any combination.

The invention can be implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for processing a request at a computing system having a plurality of computers coupled to a network, the computing system supporting a plurality of applications, said method comprising:

receiving an incoming request line comprising a Universal Resource Locator(URL);

parsing the incoming request to determine one or more segments of the incoming request line;

identifying a set of URL segments within the URL pertaining to the incoming request line;

determining whether the set of URL segments match corresponding segments of any of a plurality of predetermined URL patterns which are provided in a data structure which includes a Trie, with the different segments of the plurality of predetermined URL patterns being branches or endpoints in the Trie;

determining an appropriate one of the applications to receive the incoming request line based on the matching one of the predetermined URL patterns;

directing the incoming request line to the determined application based on at least one of the determined segments of the incoming request line;

receiving a response to the incoming request line from the determined application; and responding to the incoming request line with the response provided by the determined application.

2. The method as recited in claim 1, wherein said determining of the appropriate one of the applications to receive the incoming request line comprises:

determining whether one or more of the determined segments of the incoming request line match any of a plurality of predetermined patterns; and determining the appropriate one of the applications to receive the incoming request line based on the matching of one or more of the determined segments to one of the predetermined patterns.

3. The method as recited in claim 1, wherein said determining whether the set of the URL segments match corresponding segments of any of the plurality of predetermined URL patterns operates to simultaneously evaluate the predetermined URL patterns.

4. The method as recited in claim 1, wherein the predetermined URL patterns are programmatically defined and compiled into a data structure.

5. The method as recited in claim 1, wherein the computing system is a data center that hosts at least one website, wherein the incoming request line is a request for information pertaining to the website.

6. The method as recited in claim 5, wherein the applications are web applications.

7. A computing system having a plurality of server computers for supporting a website, comprising:

a processor and a memory in each of the plurality of server computer;

a plurality of applications configured to interface with a plurality of processes operable on a set of the server computers; and a load balancer operatively connected to direct an incoming request including a URL to one of said applications, wherein the load balancer is configured to, identify a set of URL segments within the URL pertaining to the incoming request, determine whether the set of URL segments match corresponding segments of any of a plurality of predetermined URL patterns stored in a data structure which includes a Trie, with the different segments of the plurality of predetermined patterns being branches or endpoints in the Trie, and determine the appropriate one of the applications to receive the incoming request based on the matching one of the predetermined URL patterns.

8. The computing system as recited in claim 7, wherein said load balancer simultaneously compares the incoming request against the set of predetermined patterns to provide the comparison data.

9. The computing system as recited in claim 7, wherein the set of predetermined patterns are provided in a data structure.

10. The computing system as recited in claim 9, wherein the data structure allows said load balancer to simultaneously compare the incoming request against the set of predetermined patterns.

11. The computing system as recited in claim 7, the comparing of the incoming request against the set of predetermined patterns by said load balancer comprises determining whether a URL corresponding to the incoming request matches any of the predetermined patterns.

12. The computing system as recited in claim 7, wherein the server computers are arranged into different partitions, and wherein each of said applications are operable to select and interface with a subset of the partitions.

13. The computing system as recited in claim 12, wherein the partitions are configured to interface with the processes operating on the server computers.

14. The computing system as recited in claim 12, wherein said applications are configured to parse the incoming request against a set of predetermined patterns to determine the one of the partitions to receive the incoming request.

15. The computing system as recited in claim 14, wherein the parsing identifies a plurality of segments of the incoming request, and wherein at least one of the segments is a parameter pertaining to a programming language object.

16. The computing system as recited in claim 7, wherein said load balancer receives configuration data embodying the set of predetermined patterns.

17. The computing system as recited in claim 16, wherein the predetermined patterns are programmatically defined and compiled into the configuration data.

18. A computer readable medium, which is non-transitory, including at least executable computer program code tangibly embodied therein for processing a request to a computing system coupled to a network, where the computing system supports a plurality of applications, said computer readable medium comprising:

computer program code for receiving an incoming request line comprising a Universal Resource Locator;

computer program code for parsing the incoming request line containing a URL to determine one or more segments of the incoming request line;

computer program code for identifying a set of URL segments within the URL pertaining to the incoming request line;

computer program code for determining whether the set of URL segments match corresponding segments of any of a plurality of predetermined URL patterns which are provided in a data structure which includes a Trie, with the different segments of the plurality of predetermined patterns being branches or endpoints in the Trie;

computer program code for determining an appropriate one of the applications to receive the incoming request based on the matching of one of the predetermined URL patterns; and computer program code for directing the incoming request line to the determined application.

19. The computer readable medium as recited in claim 18, wherein the predetermined patterns are programmatically defined and compiled into a data structure.

20. The computer readable medium as recited in claim 19, wherein said computer readable medium further comprises:

computer program code for receiving a response to the incoming request line from the determined application; and computer program code for responding to the incoming request line with the response provided by the determined application.

21. A computer readable medium, which is non-transitory, including at least executable computer program code tangibly embodied therein for processing universal resource locators, said computer readable medium comprising:
- computer program code for parsing an incoming request containing a URL to determine one or more segments of the incoming request;
- computer program code for identifying a set of URL segments within the URL pertaining to the incoming request;
- computer program code for determining whether the set of URL segments match corresponding segments of any of a plurality of predetermined URL patterns which are provided in a data structure which includes a Trie, with the different segments of the plurality of predetermined patterns being branches or endpoints in the Trie; and
- computer program code for dispatching the incoming URL to an application for processing based on one of the predetermined URL patterns that matches the incoming URL.

22. The computer readable medium as recited in claim 21, wherein said computer readable medium further comprises: computer program code for generating a URL in accordance with one of the predetermined URL patterns.

* * * * *